United States Patent [19]

Crawford et al.

[11] 4,410,117
[45] Oct. 18, 1983

[54] COMBINATION BUMPER AND SPARE TIRE CARRIER

[76] Inventors: John Crawford, 1282 Alicante Dr., Pacifica, Calif. 94044; Wayne Crawford, 700 Felton St., San Francisco, Calif. 94134

[21] Appl. No.: 396,034

[22] Filed: Jul. 7, 1982

[51] Int. Cl.³ .............................................. B62D 43/02
[52] U.S. Cl. .............................. 224/42.06; 224/42.24; 224/42.21; 296/37.2; 414/466
[58] Field of Search ............... 224/42.44, 42.05, 42.08, 224/42.21, 42.06, 42.12, 42.04, 42.29; 414/463, 466; 296/37.2; D12/202

[56] References Cited

U.S. PATENT DOCUMENTS

| | | |
|---|---|---|
| 1,252,483 | 1/1918 | Pattison .......................... 224/42.29 X |
| 2,819,004 | 1/1958 | Kubik et al. ...................... 224/42.21 |
| 3,343,736 | 9/1967 | Sellers . |
| 3,362,597 | 1/1968 | Beach, Jr. . |
| 3,507,514 | 4/1970 | Betz . |
| 3,610,658 | 10/1971 | Sartori . |
| 3,613,971 | 10/1971 | Betz . |
| 3,822,814 | 7/1974 | Baldi . |

FOREIGN PATENT DOCUMENTS 2009687 6/1979 United Kingdom ............. 224/42.26

Primary Examiner—Allan N. Shoap
Assistant Examiner—Robert Petrik
Attorney, Agent, or Firm—Limbach, Limbach & Sutton

[57] ABSTRACT

A new and improved combination bumper and spare tire carrier is disclosed adapted to be affixed to a tailgate of a vehicle without inhibiting the operation of the tailgate. The subject carrier includes a bracket member which projects rearwardly from the vehicle. A generally planar frame is pivotally connected to the bracket member at a point offset from the hinge of the tailgate. A planar attachment plate is provided, having one end thereof slidably received within channels formed in a pair of spaced apart guide members attached to the frame. The upper end of the attachment plate is connected to the upper edge of the tailgate to define a telescoping configuration. By this arrangement, the tailgate and the frame may be simultaneously moved between the open and closed positions. In the preferred embodiment, a pair of bumper segments are provided and disposed on either side of the frame. The bumper segments and spare tire combination define a relatively continuous bumper configuration. A tow package can also be provided with the carrier.

11 Claims, 4 Drawing Figures

COMBINATION BUMPER AND SPARE TIRE CARRIER

BACKGROUND OF THE INVENTION

The subject invention relates to a new and improved combination bumper and spare tire carrier. More particularly, a new and improved carrier is disclosed which is adapted to be affixed to a tailgate of a vehicle without inhibiting the operation of the tailgate.

In the prior art, a variety of spare tire carriers have been developed, particularly for use with off-road type vehicles such as pickup trucks. Without a carrier, the spare tire is typically stored in the bed of the pickup which reduces the load space of the vehicle. Another problem associated with the latter is storage arrangement is that the spare tire will often be relatively inaccessible when the load area of the truck bed has been filled. Accordingly, various means have been developed for mounting the tire at a location other than the load area of the vehicle.

One type of carrier which has been developed enables a spare tire to be mounted below or underneath the bed of the vehicle. This approach has proved undesirable for a number of reasons. For example, a tire which is mounted below the bed of a vehicle necessarily reduces its road clearance. In addition, in some situations, owners prefer to utilize this area to mount a reserve fuel tank for extending the range of the vehicle.

Thus, carriers have been developed for mounting a spare tire on the rear or tailgate portion of the vehicle. These carriers typically include a bracket which is spaced rearwardly from the tailgate of the vehicle. This approach is necessary to provide clearance for the tire when the tailgate is opened. Stated differently, if the tire was mounted directly onto the tailgate of the vehicle, it would block the motion of the tailgate when it is moved from the vertical closed position to the horizontal open position.

One type of prior art carrier is illustrated in U.S. Pat. No. 3,343,736, issued Sept. 26, 1967 to Sellers. The carrier disclosed in Sellers includes a rearwardly extending bracket pivotally connected to an upstanding carrier bar upon which the tire may be mounted. The bracket and carrier bar define a generally L-shaped configuration. The carrier is designed such that the upstanding bar may be rotated into a horizontal position to enable the tailgate of the vehicle to be opened.

The latter design has a variety of shortcomings. For example, prior to opening the tailgate, the user must independently lower the spare tire into the horizontal position. In the horizontal position, the tire projects outwardly, such that the user must reach over the tire to reach the tailgate. Another more significant problem associated with the latter design is that the upper end of the carrier bar is unsupported. Thus, when subjected to frequent bouncing and jarring typical of off-road terrain, the unsupported upper end of the bar will tend to move and swing, causing stresses to develop in the metal support. This movement will eventually lead to metal fatigue and the breakdown of the part.

Another carrier design which addresses some of the above described problems can be found in U.S. Pat. No. 3,387,754, issued June 11, 1968 to Sinkey. The device in Sinkey includes a rearwardly projecting bracket pivotally connected to a pair of upstanding bars upon which the spare tire is mounted. The upper ends of the mounting bars are provided with a pair of hooks which are adjusted to grip the upper free edge of the tailgate of the vehicle. By securing the upper end of the carrier to the tailgate, the problems associated with stresses and metal fatigue generated by vibration can be substantially reduced.

A major shortcoming associated with the structure disclosed in the Sinkey patent is that the carrier must be disengaged from the tailgate when the latter is moved from the closed to the open position. As can be appreciated, since the pivotal connection between the carrier bars and the bracket is spaced away from the hinged connection of the tailgate, the rotational paths traveled by the end of the tailgate and the end of the carrier will be different. Therefore, as the tailgate is moved from the closed to the open position, the hooks of the carrier will become disengaged from the tailgate.

When the tailgate is returned to the vertical closed position, the user must re-establish the connection between the carrier and the tailgate. This connection is re-established by moving the tailgate into an orientation approximately halfway between the open and closed positions. The carrier may then be aligned with the tailgate permitting the combination to be moved back into its initial position. As can be appreciated, the above described procedure, wherein the user must lean over the end of the spare tire to reach the tailgate, raise the tailgate and then align the carrier before closing the tailgate, is both difficult and inconvenient. Accordingly, it would be desirable to provide a new and improved spare tire carrier which obviates the problems associated with the prior art.

Therefore, it is an object of the subject invention to provide a new and improved combination bumper and spare tire carrier which operates automatically with the movement of the tailgate.

It is another object of the subject invention to provide a new and improved combination bumper and spare tire carrier which does not interfere with the rotation of the tailgate.

It is a further object of the subject invention to provide a new and improved combination bumper and spare tire carrier having a telescoping configuration to permit the upper end of the carrier to remain connected to the tailgate during the rotation of the combination.

It it still another object of the subject invention to provide a carrier having a new and improved configuration such that when a spare tire is mounted thereon, a continuous protective bumper is defined.

It is still a further object of the subject invention to provide a new and improved combination bumper and spare tire carrier which also includes a tow package.

SUMMARY OF THE INVENTION

In accordance with these and many other objects, the subject invention provides for a spare tire carrier adapted for mounting adjacent the tailgate of a vehicle. The subject carrier is intended to move automatically with the tailgate when the latter is rotated about a lower hinge between a vertical closed position and a horizontal open position. The subject carrier includes a bracket member which is affixed to the vehicle and projects rearwardly therefrom. A generally planar frame means is pivotally connected to the bracket member at a point offset from the hinge of the tailgate. A means for mounting a spare tire on the frame is provided.

In accordance with the subject invention, the carrier is provided with a means which permits the frame to remain connected to the tailgate during its movement between the open and closed position. More particularly, an attachment plate is provided, having one end thereof slidably received within channels formed in a pair of spaced apart guide members affixed to the frame means. The upper free end of the attachment plate is fixedly mounted to the upper edge of the tailgate to define a telescoping configuration. The telescoping configuration permits the end of the attachment plate to remain connected to the tailgate, during rotation, even though their respective pivot points are offset. Preferably, the upper edge of the attachment plate is defined by a U-shaped hook to facilitate its connection to the tailgate.

In the preferred embodiment of the subject invention, the carrier is further provided with a pair of spaced apart bumper segments disposed on either side of the frame means. The dimensions of the carrier are arranged such that when a spare tire is mounted on the frame it will lie between the bumper segments whereby a relatively continuous protective bumper is defined. Preferably, the spare tire will project rearwardly, beyond the bumper segments, such that the majority of the force received in a rear-end collision will be absorbed by the tire. The subject carrier may be additionally provided with a tow package to permit a trailer to be pulled behind the vehicle.

Further objects and advantages of the subject invention will become apparent from the following detailed description taken in conjunction with the drawings in which:

DETAILED DESCRIPTION OF THE PREFERRED EMBODIMENT

Figure 1:
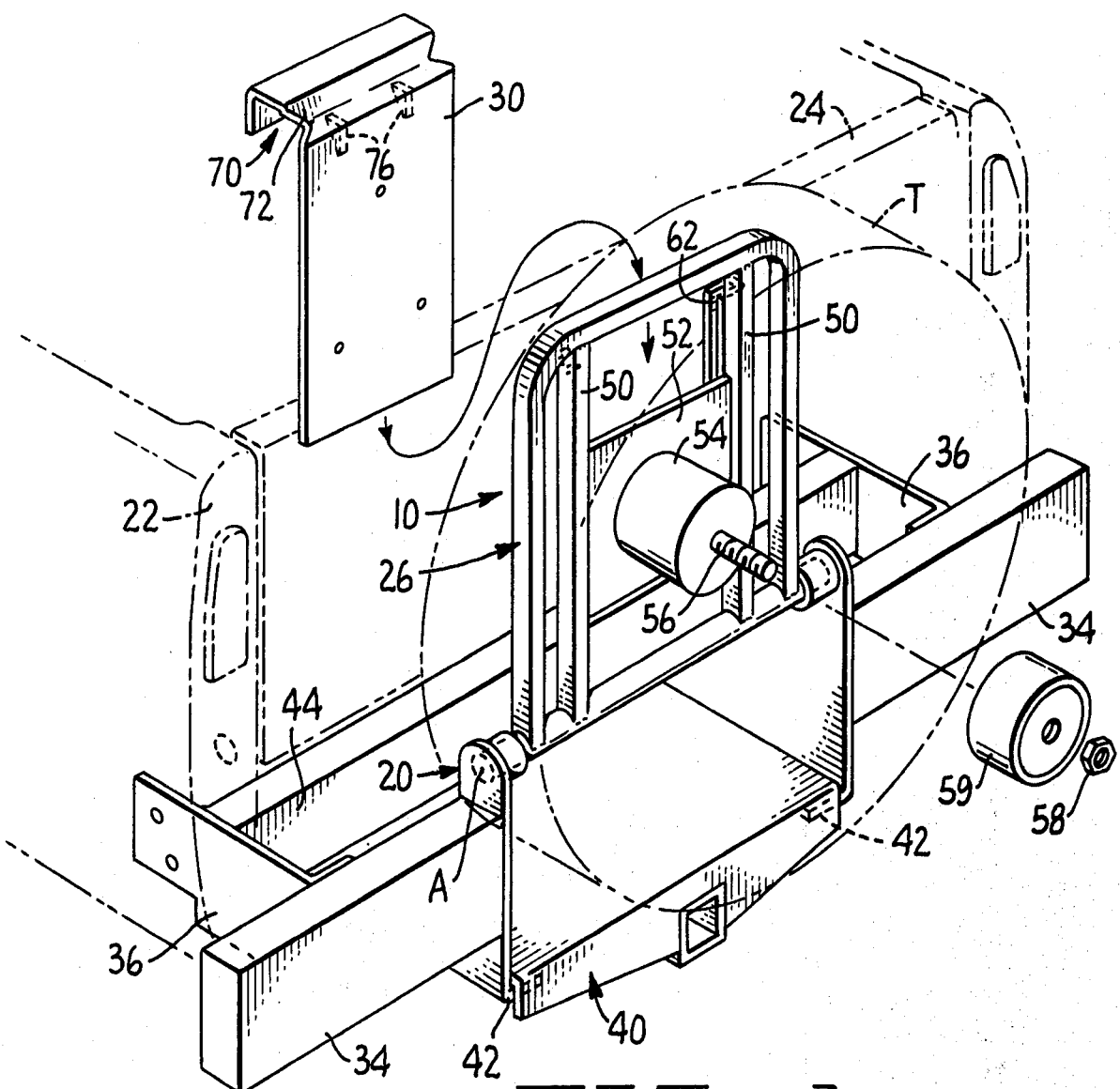
FIG. 1 is an exploded perspective view of the new and improved combination bumper and spare tire carrier of the subject invention, shown mounted on the rear of a vehicle, the latter illustrated in phantom.
Figure 2:
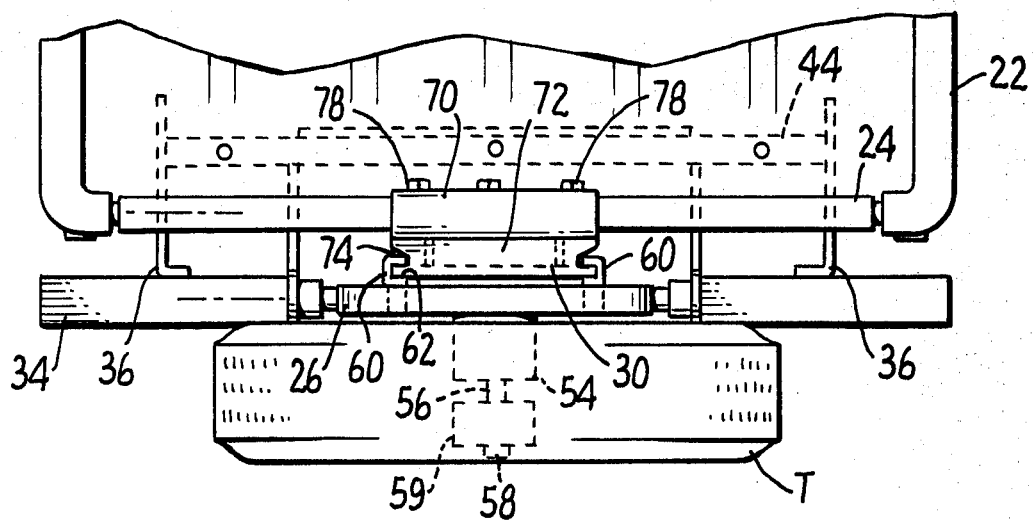
FIG. 2 is a top plan view of the new and improved combination bumper and spare tire carrier of the subject invention shown mounted on the rear of a vehicle.
Figure 3:
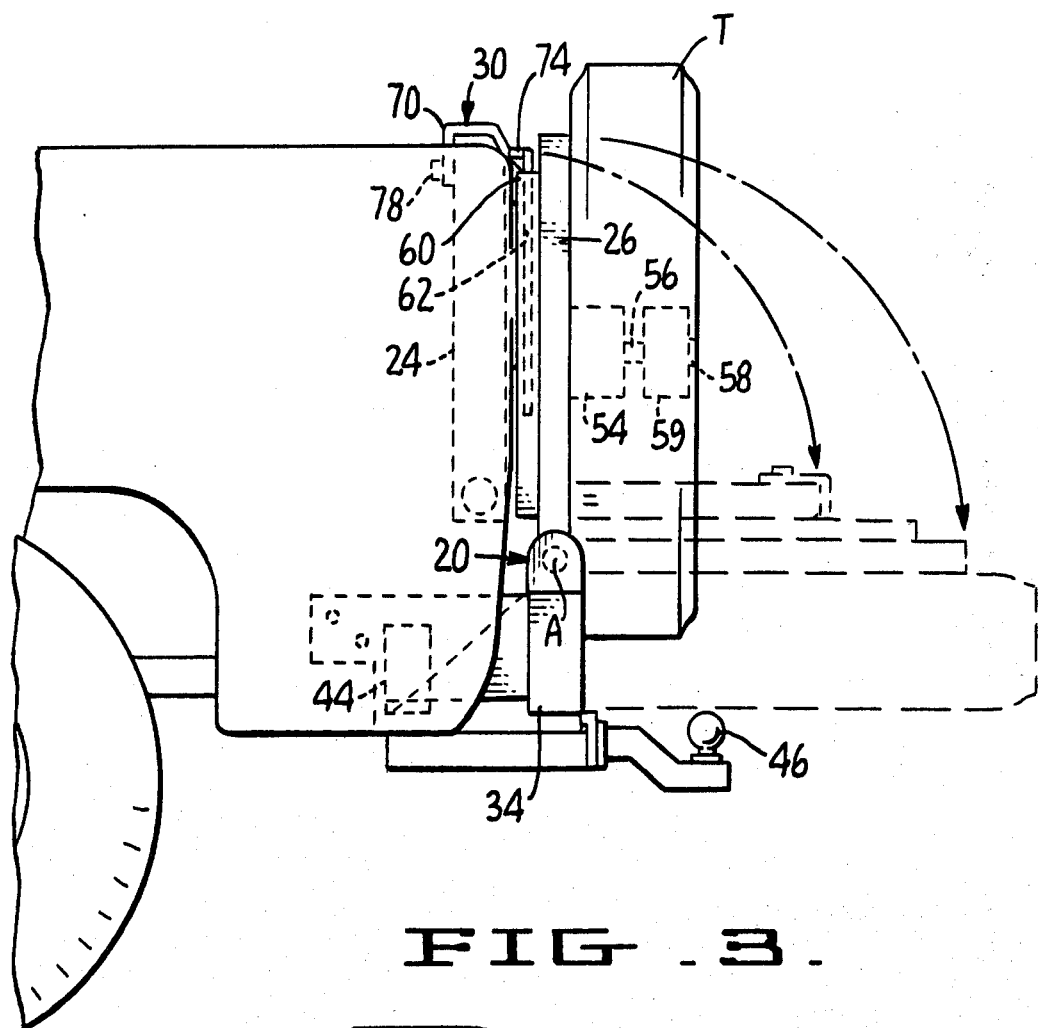
FIG. 3 is a side elevational view of the combination bumper and spare tire carrier of the subject invention shown connected to a tailgate of a vehicle and oriented in the vertically closed position.

Referring to FIG. 1, the new and improved tailgate 10 of the subject invention will be described. Generally, the subject tailgate 10 includes a bracket 20 fixedly connected to the rear of a vehicle 22 adjacent its tailgate 24. A frame 26 is pivotally connected to bracket 20 at a point A, offset from the hinge of the tailgate 24. In accordance with the subject invention, an attachment plate 30 is slidably mounted to the frame 26 to define a telescoping configuration. The upper end of plate 30 is fixedly mounted to the upper edge of the tailgate. As described more fully hereinbelow, the subject carrier can be moved simultaneously with the rotation of the tailgate without interfering with the latter's motion.

Figure 4:
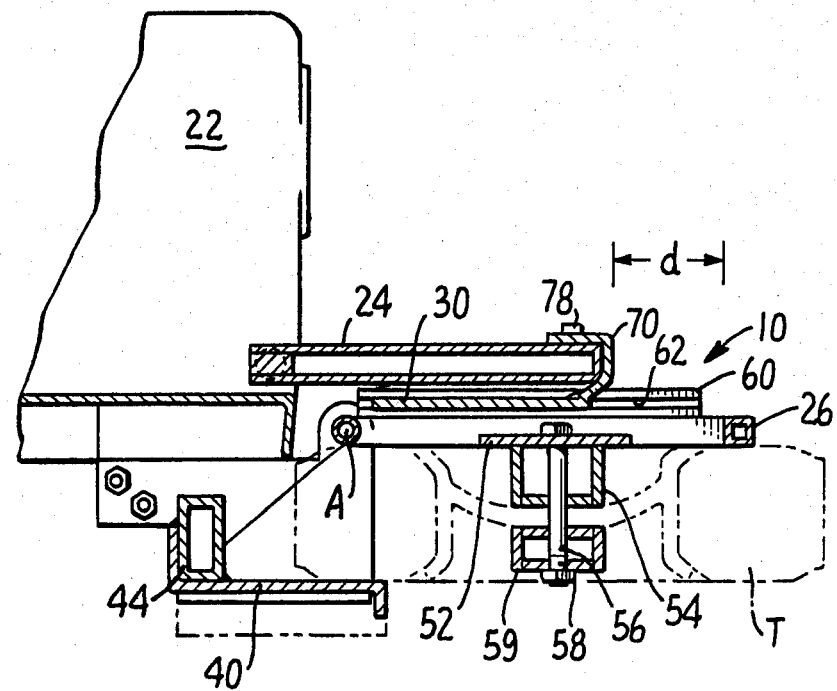
FIG. 4 is a side elevational view similar to FIG. 3, showing the new and improved combination bumper and spare tire carrier of the subject invention oriented in the horizontal, open position.

Referring to FIGS. 1 through 4, the construction of the subject tailgate 10 will be described in greater detail. In the preferred embodiment, bracket 20 includes a pair of spaced apart bumper segments 34 which are connected to the rear of the vehicle 22 by a pair of braces 36. Bumper segments 34 are spaced apart a distance sufficient to permit the spare tire T to be received therebetween when the carrier is lowered to the horizontal position as illustrated in FIG. 4.

In the preferred embodiment, bracket 20 further includes a tow package to permit a trailer to be pulled by the vehicle 22. The tow package includes a hitch plate 40 which is connected to bumper segments 34. Each bumper segment 34 may be provided with an inwardly directed flange 42 to facilitate the connection with the tow plate. A tow bar 44 is provided and is interconnected between the pair of braces 36. Tow bar 44 is preferably welded to tow plate 40 for structurally rigidifying the tow package. A tow ball 46 attachment may be affixed to the tow plate 40 and has a configuration adapted to interengage with standard trailer type hitches.

In accordance with the subject invention, a generally planar frame 26 is pivotally connected to bracket 20 along axis A, which is offset from the hinged connection of the tailgate of the vehicle. Because of this offset connection, the upper free end of the frame 26 will not travel the same path as the upper free end of the tailgate during rotation. Accordingly, and as described more fully hereinbelow, a telescoping attachment plate 30 is provided to permit the frame and tailgate to be moved simultaneously.

Frame 26 includes a pair of mounting bars 50 to which a hub support 52 is connected. A generally cylindrical hub member 54 is connected to the hub support and together defines the means for mounting a spare tire. The circumference of the cylindrical hub is intended to correspond to the central opening in a standard wheel such that the spare tire can be readily mounted thereon. A threaded stud 56 projects outwardly from the hub for receiving a nut 58 to securing the spare tire T to the hub 54. A cover hub 59 is provided to stabilize the mounting. While a relatively simple securement means is illustrated, it is intended that the scope of the subject invention include various other means, for example, a locking arrangement to prevent the theft of the spare tire.

Frame 26 is further provided with a pair of guide members 60 affixed to mounting bars 50. Each guide member 60 includes an elongated channel 62 adapted to receive attachment plate 30.

Attachment plate 30 is generally planar in configuration. As discussed above, the lower end of the attachment plate is adapted to be slidably received within the channels 62 of guide members 60. In accordance with the subject invention, the upper end of the attachment plate 30 is intended to be fixedly connected to the upper edge of the tailgate 24 of the vehicle 22. In the preferred embodiment, the upper edge of the attachment plate is configured to facilitate this attachment. More particularly, as is illustrated in the figures, the upper edge of the attachment plate is defined by a generally U-shaped hook 70 which is intended to engage with the upper edge of the tailgate. Preferably, the hook 70 is offset from the planar attachment plate by a spacer 72 to permit alignment of the carrier with the tailgate. A pair of slots 74 are formed in the spacer 72 to permit the attachment plate to slide freely in channels, as discussed more fully hereinbelow. The hook and spacer combination may be reinforced with a pair of stiffeners 76. Hook 70 may be affixed to the tailgate by any suitable means, such as sheet metal screw 78. The telescoping arrangement of the attachment plate also permits the subject carrier to be utilized with vehicles having tailgates of various heights.

Having described the construction of the subject carrier 10 in detail, its operation in conjunction with the vehicle 22 will now be described. More particularly, and referring to FIGS. 2, 3 and 4, the subject carrier 10 is shown mounted to a vehicle by braces 36. The upper edge of the attachment plate 30 is fixedly connected to the upper free edge of the tailgate 24 of the vehicle. The spare tire T is mounted on the hub 54 of the frame. As can be seen, the spare tire is disposed bewteen the pair of bumper segments 34 such that the combination of the tire and the bumper segments defines a continuous protective bumper. In the preferred embodiment of the subject invention, the dimensions of the carrier are arranged such that the spare tire T projects rearwardly beyond the plane of the bumper segments, such that in a rear-end collision, the soft rubber of the tire can absorb a large portion of the force of impact.

In accordance with the subject invention, the carrier 10 can be moved simultaneously with the rotation of the tailgate, between the vertical closed position and horizontal open position. More particularly, as the tailgate 24 is lowered, the attachment plate 30 will tend to be telescoped inwardly within the channels of guide members 60. In the illustrated embodiment, attachment plate 30 will slide along channels 62 a distance "d", as shown in FIG. 4. The slots 74, provided in hook 70 of the attachment plate, permit unobstructed movement. In the lowering of the tailgate, the lower portion of spare tire T is received in the area between the pair of spaced apart bumper segments 34. When the tailgate is to be closed, it is merely returned to its initial position. During the return motion, attachment plate 30 tends to telescope outwardly to accommodate the different paths of travel of the joined ends of the frame and tailgate.

As discussed above, the subject invention provides for a carrier which can be operated simultaneously with a tailgate. The subject carrier permits a spare tire to be mounted on the rear of the vehicle such that load space is conserved. In addition, a structure having rigid supports is defined which will withstand vibrations generated during off-road travel. The carrier also includes a bumper configuration for added safety for the vehicle. In a preferred embodiment, a tow package is provided for pulling a trailer.

In summary, a new and improved spare tire carrier 10 is disclosed for mounting adjacent the tailgate 24 of a vehicle 22. The carrier includes a bracket member 20 which projects rearwardly from the vehicle. A generally planar frame means 26 is pivotally connected to the bracket member at a point A, offset from the hinge of the tailgate. Frame 26 includes a means for mounting the spare tire. In accordance with the subject invention, the frame means further includes a pair of spaced apart guide members 60, each having a channel 62 defined therein. A planar attachment plate 30 is provided, having one end thereof slidably received within the channels of the guide members. The upper free end of the attachment plate is fixedly mounted to the upper edge of the tailgate to define a telescoping configuration. In operation, the subject carrier and tailgate can be moved simultaneously between the open and closed positions while maintaining the connection therebetween. In the preferred embodiment, the bracket member includes a pair of spaced apart bumper segments 34 which in combination with a spare tire, define a relatively continuous bumper configuration.

While the subject invention has been described with reference to a preferred embodiment, it is to be understood that various other changes and modifications could be made therein, by one skilled in the art, without varying from the scope and spirit of the subject invention as defined by the appended claims.

We claim:

1. A spare tire carrier adapted for mounting adjacent the tailgate of a vehicle wherein the tailgate is rotatable about a lower hinge between a vertical, closed position and a horizontal, open position, said carrier comprising:
   a bracket member spaced rearwardly from said tailgate;
   a generally planar frame means pivotally connected to said bracket member at a point offset laterally from the hinge of said tailgate, said frame means including a means for mounting a spare tire juxtaposed to the rearward side of said frame means, said frame means further including a pair of spaced apart guide members, each guide member having a channel defined therein; and
   a planar attachment plate, with the opposed side edges of said attachment plate being slidably received within the channels of said guide members and with the upper end of said attachment plate being fixedly mounted to the upper edge of said tailgate to define a telescoping configuration enabling said tailgate and frame means combination to be simultaneously moved between the open and closed positions while maintaining the connection therebetween.

2. A carrier as recited in claim 1 wherein said bracket member includes a pair of spaced apart bumper segments disposed on either side of said frame means such that when said spare tire is mounted on said carrier, the combination of said tire and said bumper segments defines a relatively continuous bumper configuration.

3. A carrier as recited in claim 1 wherein the dimensions of said bumper segments are arranged such that said spare tire projects rearwardly beyond said bumper segments whereby the spare tire is in position to absorb the majority of the force of a rear-end collision.

4. A carrier as recited in claim 1 wherein said upper end of said attachment plate includes a hook means adapted to interengage with the upper edge of said tailgate to facilitate the connection therebetween.

5. A carrier as recited in claim 4 wherein, said hook means includes a spacer member connected to the upper edge of said attachment plate and projecting towards the tailgate, and wherein said spacer member includes a pair of slots disposed in the opposed side edges thereof, said slots being aligned with said guide members such that said spacer member can move freely past said guide members during the slidable movement of said attachment plate.

6. A carrier as recited in claim 1 wherein said bracket member further includes a rearwardly projecting tow means to facilitate the towing of a trailer behind said vehicle.

7. A spare tire carrier and bumper combination adapted for mounting adjacent the tailgate of a vehicle, wherein the tailgate is rotatable about a lower hinge between a vertical, closed position and a horizontal, open position, said combination comprising:

a bracket member spaced rearwardly from said tailgate, said bracket member including a pair of spaced apart bumper segments;

a generally planar frame means disposed between said bumper segments of said bracket member and pivotally connected to said bracket member at a point laterally offset from the hinge of said tailgate, said frame means including a means for mounting a spare tire juxtaposed to the rearward side of said frame means such that the combination of said spare tire and said bumper segments defines a relatively continuous bumper configuration, and with said frame means further including a pair of spaced apart guide members, each guide member having a channel defined therein; and a planar attachment plate with the opposed side edges of said attachment plate being slidably received within the channels of said guide members and with the upper end of said attachment plate being fixedly mounted to the upper edge of said tailgate to define a telescoping configuration enabling said tailgate and frame means combination to be simultaneously moved between the open and closed positions while maintaining the connection therebetween.

8. A carrier as recited in claim 7 wherein the dimensions of said bumper segments are arranged such that said spare tire projects rearwardly beyond said bumper segments whereby the spare tire is in position to absorb the majority of the force of a rear-end collision.

9. A carrier as recited in claim 7 wherein said upper end of said attachment plate includes a hook means adapted to interengage with the upper edge of said tailgate to facilitate the connection therebetween.

10. A carrier as recited in claim 9 wherein said hook means includes a spacer member connected to the upper edge of said attachment plate and projecting towards the tailgate and wherein said spacer member includes a pair of slots disposed in one opposed side edge thereof, said slots being aligned with said guide members such that said spacer member can move freely past said guide members during the slidable movement of said attachment plate.

11. A carrier as recited in claim 7 wherein said bracket member further includes a rearwardly projecting tow means to facilitate the towing of a trailer behind said vehicle.

* * * * *